(12) United States Patent
Patil et al.

(10) Patent No.: US 10,394,882 B2
(45) Date of Patent: Aug. 27, 2019

(54) MULTI-IMAGE INPUT AND SEQUENCED OUTPUT BASED IMAGE SEARCH

(71) Applicant: International Business Machines Corporation, Armonk, NY (US)

(72) Inventors: Sandeep R. Patil, Pune (IN); Sarbajit K. Rakshit, Kolkata (IN)

(73) Assignee: International Business Machines Corporation, Armonk, NY (US)

( * ) Notice: Subject to any disclaimer, the term of this patent is extended or adjusted under 35 U.S.C. 154(b) by 609 days.

(21) Appl. No.: 14/183,608

(22) Filed: Feb. 19, 2014

(65) Prior Publication Data
US 2015/0234862 A1   Aug. 20, 2015

(51) Int. Cl.
*G06F 16/00* (2019.01)
*G06F 16/583* (2019.01)
(Continued)

(52) U.S. Cl.
CPC .......... *G06F 16/5854* (2019.01); *G06F 16/14* (2019.01); *G06F 16/248* (2019.01); *G06F 16/40* (2019.01); *G06F 16/50* (2019.01); *G06F 16/532* (2019.01); *G06F 16/904* (2019.01); *G06F 16/951* (2019.01)

(58) Field of Classification Search
CPC ......... G06F 17/30265; G06F 17/30247; G06F 17/30056; G06F 16/951; G06F 16/532; G06F 16/50; G06F 16/904; G06F 16/9535; G06F 16/70; G06F 16/434; G06F 16/14;
(Continued)

(56) References Cited

U.S. PATENT DOCUMENTS 7,725,451 B2   5/2010   Jing et al.
8,285,055 B1 *  10/2012   Barnes ............... G06T 7/337
                                                       382/108
(Continued)

FOREIGN PATENT DOCUMENTS

WO   2012058794 A1   5/2012

OTHER PUBLICATIONS

Firan et al., "Bringing Order to Your Photos: Event-Driven Classification of Flickr Images Based on Social Knowledge", CIKM'10, Oct. 26-30, 2010, Toronto, Ontario, Canada, pp. 189-198. Copyright 2010 ACM 978-1-4503-0099-5/10/10.
(Continued)

*Primary Examiner* — Srirama Channavajjala
(74) *Attorney, Agent, or Firm* — Isaac J. Gooshaw; David B. Woycechowsky

(57) ABSTRACT

A search engine: (i) receives a search query including a subject-matter-describing data set, a first boundary-condition-describing data set and a second boundary-condition-describing data set; (ii) determines a first boundary condition based on the first boundary-condition-describing data set; (iii) determines a second boundary condition based on the second boundary-condition-describing data set; and (iv) finds search results that meet the following criteria: (a) apparently relate to the subject matter of the subject-matter-describing data set, and (b) apparently fall between a first boundary condition and a second boundary condition. Also, a user specifies a document, along with a search query, and the search engine uses the document to limit and/or organize the search results.

17 Claims, 4 Drawing Sheets

(51) Int. Cl.
*G06F 16/951* (2019.01)
*G06F 16/532* (2019.01)
*G06F 16/248* (2019.01)
*G06F 16/50* (2019.01)
*G06F 16/14* (2019.01)
*G06F 16/904* (2019.01)
*G06F 16/40* (2019.01)

(58) Field of Classification Search
CPC ...... G06F 16/148; G06F 16/40; G06F 16/248; G06F 16/5854
See application file for complete search history.

(56) References Cited

U.S. PATENT DOCUMENTS

| | | | |
|---|---|---|---|
| 8,352,465 | B1 | 1/2013 | Jing et al. |
| 2004/0167785 | A1* | 8/2004 | Kimura ............... G06K 9/62 704/500 |
| 2006/0262352 | A1* | 11/2006 | Hull ................. G06F 21/78 358/1.18 |
| 2006/0265197 | A1* | 11/2006 | Peterson ............... G06T 9/40 703/2 |
| 2007/0136259 | A1* | 6/2007 | Dorfman ............... G01C 21/26 |
| 2008/0082426 | A1* | 4/2008 | Gokturk ............... G06Q 30/0625 705/26.62 |
| 2011/0016398 | A1* | 1/2011 | Hanes ............... G11B 27/105 715/730 |
| 2011/0044563 | A1* | 2/2011 | Blose ............... G06F 17/30265 382/306 |
| 2011/0058748 | A1* | 3/2011 | Trifonov ............... G06K 9/6209 382/199 |
| 2011/0219025 | A1 | 9/2011 | Lipson et al. |
| 2012/0027293 | A1* | 2/2012 | Cok ............... G06F 17/30056 382/164 |
| 2012/0110453 | A1 | 5/2012 | Ma et al. |
| 2012/0128241 | A1* | 5/2012 | Jung ............... G06K 9/00711 382/165 |
| 2012/0290564 | A1* | 11/2012 | Mok ............... G16H 10/60 707/722 |
| 2012/0330922 | A1* | 12/2012 | Kong ............... G06F 16/434 707/709 |
| 2014/0229963 | A1* | 8/2014 | Petrovic ............... H04N 21/252 725/13 |

OTHER PUBLICATIONS

Lu et al., "Tag-based personalized image ranking in event browsing", Peer-to-Peer Networking and Applications vol. 6, Issue 4 , pp. 434-444, Cover Date: Dec. 1, 2013, DOI: 10.1007/s12083-013-0214-6, Received: Jan. 6, 2013 / Accepted: Apr. 25, 2013 / Published online: May 21, 2013, © Springer Science+Business Media New York 2013.

Petkos et al., "Social event detection using multimodal clustering and integrating supervisory signals", ACM International Conference on Multimedia Retrieval, Hong Kong, Jun. 5-8, 2012, pp. 1-23.

Strauss, Bob, "Dinosaurs A to Z—A Complete, A to Z List of Every Dinosaur that Ever Lived", URL provided in disclosure by inventor on Jun. 3, 2013, <http://dinosaurs.about.com/od/typesofdinosaurs/a/dinosaursatoz.htm>.

\* cited by examiner

MULTI-IMAGE INPUT AND SEQUENCED OUTPUT BASED IMAGE SEARCH

BACKGROUND OF THE INVENTION

The present invention relates generally to the field of image searches, and more particularly to the manner in which results of image searches are returned (that is, presented or displayed) to a user (such as a human user).

Image (see definition, below) searches are known. Typically a user (see definition, below) enters one or more words (sometimes herein referred to as a "key phrase" or "key word") that describe the subject matter of the images that the user would like to see. A machine logic module (see definition, below) called a "search engine" then finds relevant images and sends the images back to the user as image files, smaller size versions of the image files (called "thumbnails"), network address links to the image files, network address links to web pages in which the image files are displayed, etc.

SUMMARY

According to an aspect of the present, invention, there is a method, system and/or computer program product that performs the following steps (not necessarily in the following order): (i) receiving, from a user and by a machine logic based image search engine, a search query including a subject-matter-describing data set, a first boundary-condition-describing data set and a second boundary-condition-describing data set; (ii) determining, by the image search engine, a first boundary condition based on the first boundary-condition-describing data set; (iii) determining, by the image search engine, a second boundary condition based on the second boundary-condition-describing data set; and (iv) finding, by the image search engine, search results that meet the following criteria: (a) apparently relate to the subject matter of the subject-matter-describing data set, and (b) apparently fall between a first boundary condition and a second boundary condition. The first and second boundary conditions both set one of the following types of boundaries: (i) time boundary, or (ii) space boundary.

DETAILED DESCRIPTION

Figure 1:
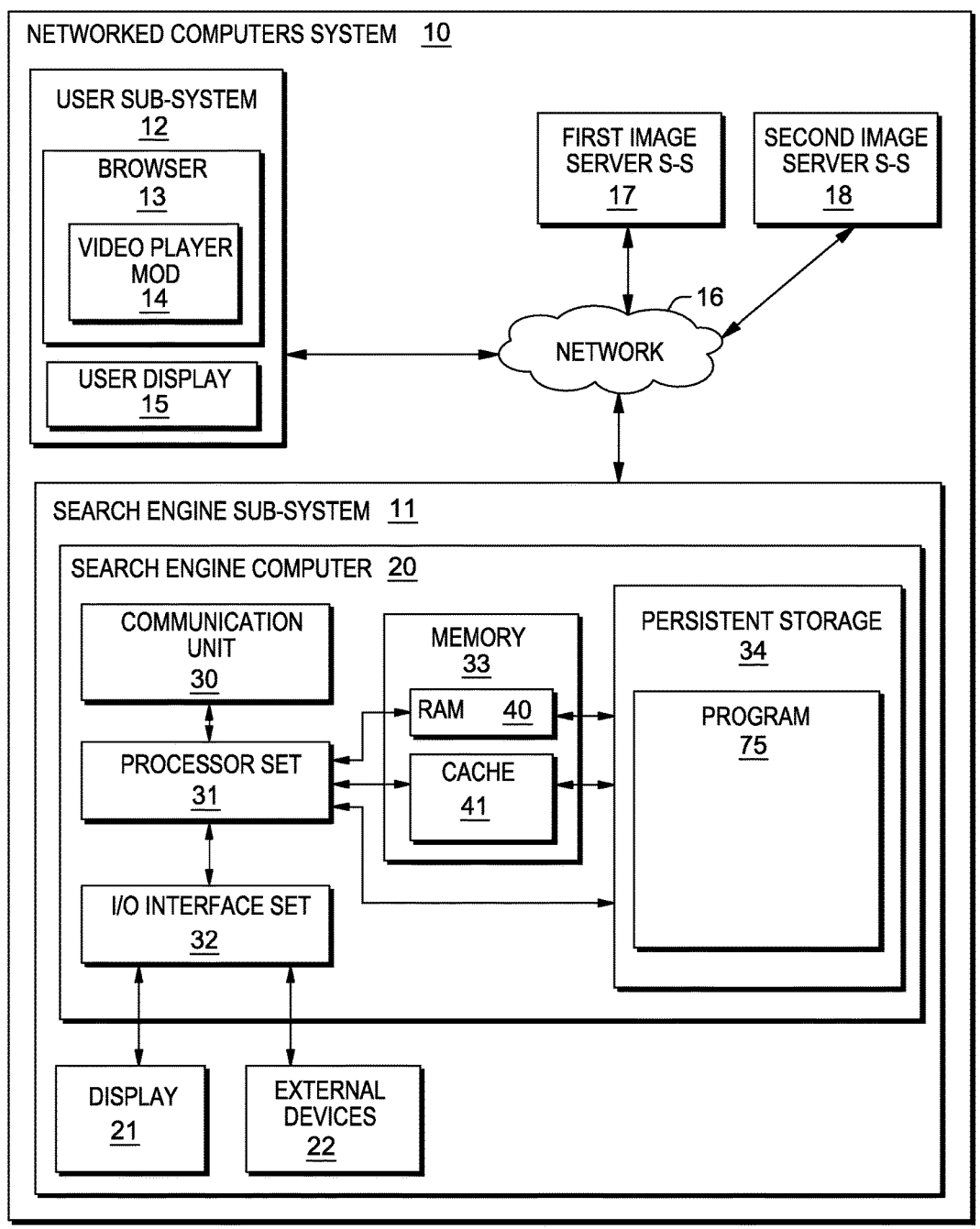
FIG. 1 is a schematic view of a first embodiment of a networked computers system according to the present invention.

In some embodiments of the present invention, a search engine collects and orders image search results that fall between two boundary conditions (for example, time boundaries, space boundaries). In some embodiments, these boundaries are supplied by, or derived from, user input of a human searcher. This Detailed Description section is divided into the following sub-sections: (i) The Hardware and Software Environment; (ii) Example Embodiment; (iii) Further Comments and/or Embodiments; and (iv) Definitions.

I. The Hardware and Software Environment

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

An embodiment of a possible hardware and software environment for software and/or methods according to the present invention will now be described in detail with reference to the Figures. FIG. 1 is a functional block diagram illustrating various portions of a networked computers system 10, including: search engine sub-system 11; user sub-system 12; communication network 16; first image server sub-system 17; and second image server sub-system 18. Search engine sub-system 11 includes: search engine computer 20; display device 21 and external device set 22. Search engine computer 20 includes: communication unit 30; processor set 31; input/output (i/o) interface set 32; memory device 33 (including random access memory (RAM) 40 and cache 41); persistent storage device 34 (including image search engine 75). User sub-system 12 includes: browser 13 (including video player module ("mod") 14; and user display device 15.

Search engine sub-system 11 is, in many respects, representative of the various computer sub-system(s) in the present invention. Accordingly, several portions of sub-system 11 will now be discussed in the following paragraphs.

Sub-system 11 may be, or at least include a laptop computer, tablet computer, netbook computer, personal computer (PC), a desktop computer, a personal digital assistant (PDA), a smart phone, or any programmable electronic device capable of communicating with the client sub-systems via network 16. Search engine (also called "program") 75 is a collection of machine readable instructions and/or data that is used to create, manage and control certain software functions that will be discussed in detail, below, in the Example Embodiment sub-section of this Detailed Description section.

Sub-system 11 is capable of communicating with other computer sub-systems via network 16. Network 16 can be, for example, a local area network (LAN), a wide area network (WAN) such as the Internet, or a combination of the two, and can include wired, wireless, or fiber optic connections. In general, network 16 can be any combination of connections and protocols that will support communications between server and client sub-systems.

Sub-system 11 is shown as a block diagram with many double arrows. These double arrows (no separate reference numerals) represent a communications fabric, which provides communications between various components of sub-system 11. This communications fabric can be implemented with any architecture designed for passing data and/or control information between processors (such as microprocessors, communications and network processors, etc.), system memory, peripheral devices, and any other hardware components within a system. For example, the communications fabric can be implemented, at least in part, with one or more buses.

Memory device 33 and persistent storage 34 are computer-readable storage media. In general, memory device 33 can include any suitable volatile or non-volatile computer-readable storage media. It is further noted that, now and/or in the near future: (i) external device set 22 may be able to supply, some or all, memory for sub-system 11; and/or (ii) devices external to sub-system 11 may be able to provide memory for sub-system 11.

Program 75 is stored in persistent storage 34 for access and/or execution by one or more of the respective processor(s) computer processor set 31, usually through one or more memories of memory device 33. Persistent storage 34: (i) is at least more persistent than a signal in transit; (ii) stores the program (including its soft logic and/or data), on a tangible medium (such as magnetic or optical domains); and (iii) is substantially less persistent than permanent storage. Alternatively, data storage may be more persistent and/or permanent than the type of storage provided by persistent storage 34.

Program 75 may include both machine readable and performable instructions and/or substantive data (that is, the type of data stored in a database). In this particular embodiment, persistent storage 34 includes a magnetic hard disk drive. To name some possible variations, persistent storage 34 may include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 34 may also be removable. For example, a removable hard drive may be used for persistent storage 34. Other examples include optical and magnetic disks, thumb drives, and smart cards that are inserted into a drive for transfer onto another computer-readable storage medium that is also part of persistent storage 34.

Communications unit 30, in these examples, provides for communications with other data processing systems or devices external to sub-system 11. In these examples, communications unit 30 includes one or more network interface cards. Communications unit 30 may provide communications through the use of either or both physical and wireless communications links. Any software modules discussed herein may be downloaded to a persistent storage device (such as persistent storage device 34) through a communications unit (such as communications unit 30).

I/O interface set 32 allows for input and output of data with other devices that may be connected locally in data communication with computer 20. For example, I/O interface set 32 provides a connection to external device set 22. External device set 22 will typically include devices such as a keyboard, keypad, a touch screen, and/or some other suitable input device. External device set 22 can also include portable computer-readable storage media such as, for example, thumb drives, portable optical or magnetic disks, and memory cards. Software and data used to practice embodiments of the present invention, for example, program 75, can be stored on such portable computer-readable storage media. In these embodiments the relevant software may (or may not) be loaded, in whole or in part, onto persistent storage 34 via I/O interface set 32. I/O interface set 32 also connects in data communication with display device 21.

Display device 21 provides a mechanism to display data to a user and may be, for example, a computer monitor or a smart phone display screen.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

II. Example Embodiment

Figure 2:
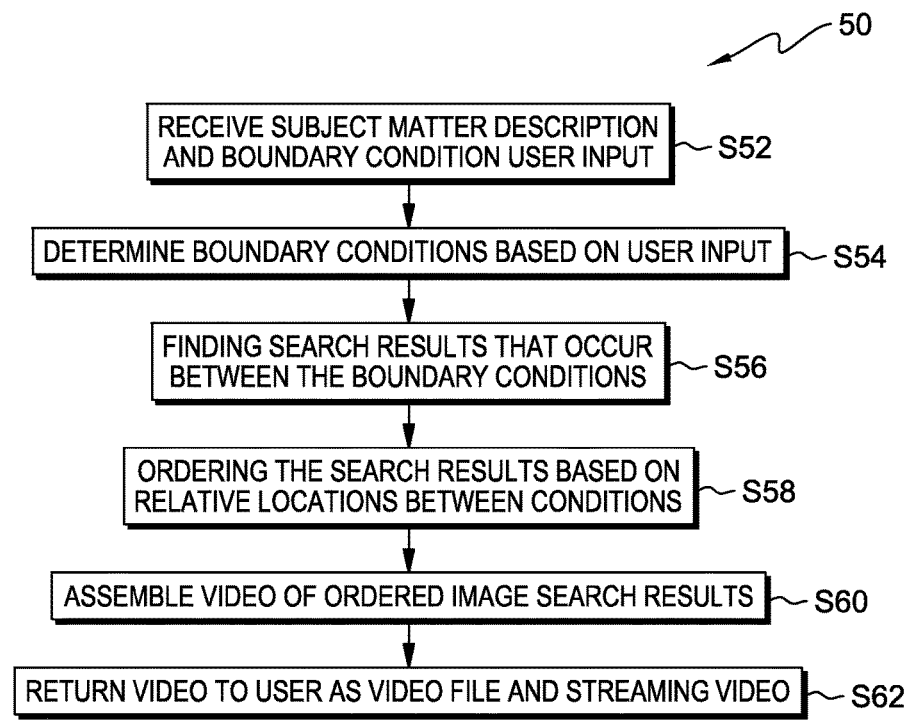
FIG. 2 is a flowchart showing a process performed, at least in part, by the first embodiment computer system.
Figure 3:
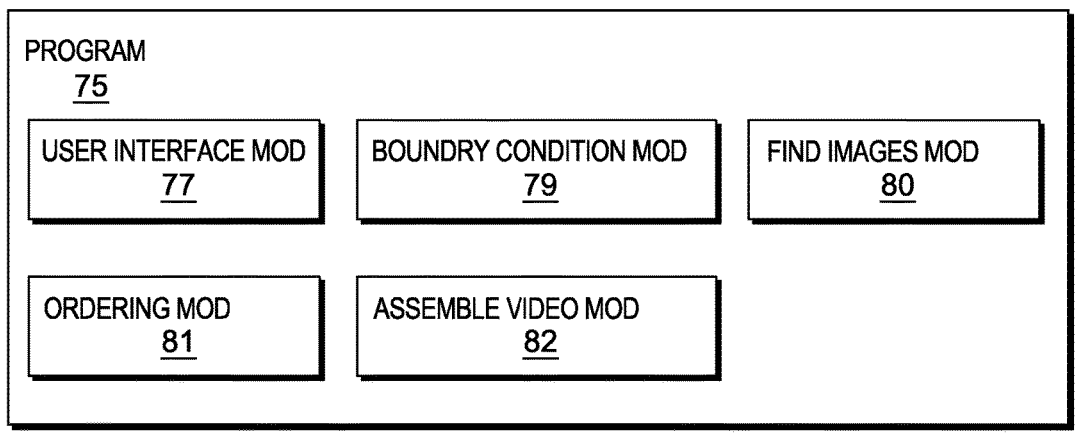
FIG. 3 is a schematic view of a search engine portion of the first embodiment system.
Figure 4A:
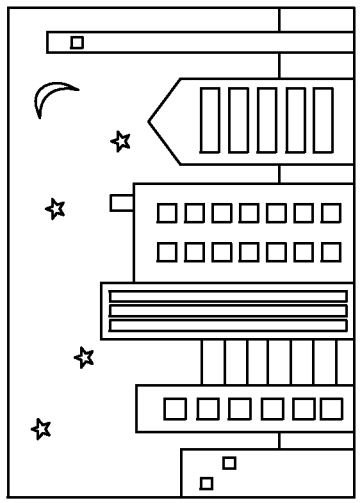
FIGS. 4A to 4F are a series of screenshots showing a video made by the first embodiment system.
Figure 4D:
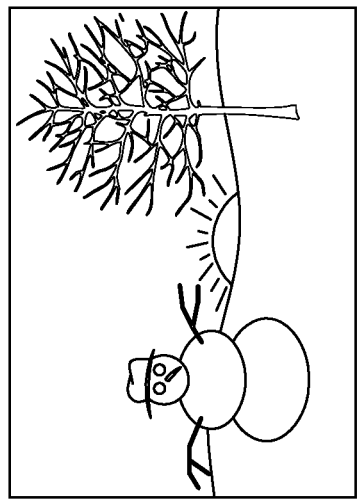
Figure 4B:
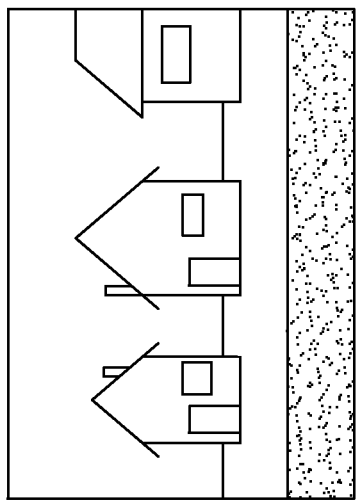
Figure 4E:
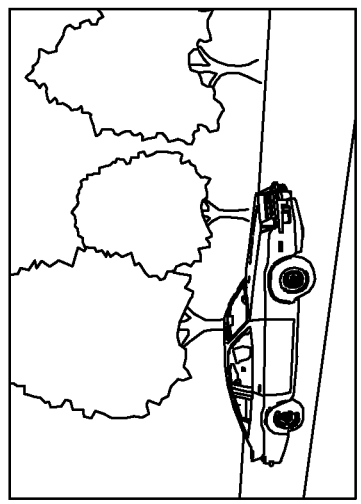
Figure 4C:
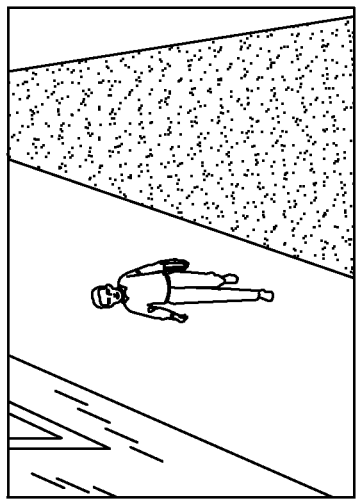
Figure 4F:
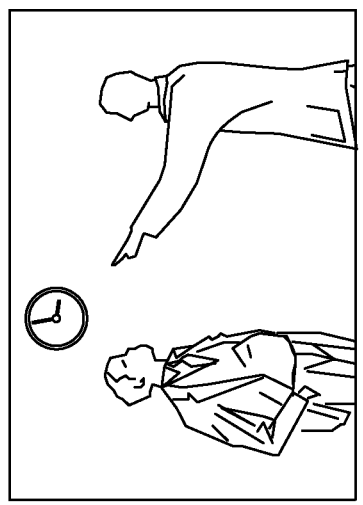

FIG. 2 is flow chart 50 showing a method according to the present invention. FIG. 3 shows program 75 for performing at least some of the method steps of flow chart 50. This method and associated software will now be discussed, over the course of the following paragraphs, with extensive reference to FIG. 2 (for the method step blocks) and FIG. 3 (for the software blocks).

Processing begins at step S52, where user interface module ("mod") 77 receives user input data from a user (via user sub-system 12) over communication network 16 (see FIG. 1). In this example, the user input data is made up of the following three pieces of data: (i) subject-matter-description data ("Alexandria, Va. USA" in this example); (ii) first boundary condition data ("1 Jan. 2007" in this example); and (iii) second boundary condition data ("31 Dec. 2010" in this example). In this example, the subject-matter-description data and the first and second boundary condition data are input by the user, and received by mod 77, as text. Alternatively, some or all of this data could be communicated in other forms, such as by audio data or image data. In this example, the boundary conditions are time conditions. Alternatively, the boundary conditions could be space conditions (for example, "East Coast of the United States" and "West Coast of the United States").

Processing proceeds to step S54, where boundary condition mod 79 converts the first and second boundary condition data into boundary conditions which are meaningful for an image search. In the example under discussion, the first boundary condition "1 Jan. 2007" is turned into the more precise time boundary condition of "00:00:00 hours/minutes/seconds, 1 Jan. 2007". In some examples, the conversion of first or second boundary conditions will be much more complex, and will require complex machine logic, such as analytics software.

This is especially true when a boundary condition does not refer to a common calendaring and timekeeping system (for time boundaries) or features shown on geographical maps (for space boundaries). For example, in the following sub-section of this Detailed Description section, boundary conditions are "bud" (meaning the budding of a rose plant) and "blossom" (meaning the blossoming of a rose plant). Clearly, a substantial amount of machine logic insight (such as insight provided by analytics) is needed to get from the two words "bud" and "blossom" to the idea that these words are meant to represent points in time in the lifecycle of the flowering portion of a rose plant. In the "bud"/"blossom" example, the subject-matter-description data is used to help make meaningful sense out of the first and second boundary condition data provided by the user as user input. Additionally, or alternatively, other forms of data could be used to help the machine logic interpret the first and second boundary conditions, such as: (i) the content of previous electronic communications between the user and various third parties; and/or (ii) the content of documents provided or linked by the user as part of her user input for the search.

Processing proceeds to step S56, where find images mod 80 finds images (see definition, below) that meet the following conditions: (i) are determined to relate to the subject matter defined by the subject-matter-description data input at step S52; and (ii) are determined to be between the first and second boundary conditions as determined at step S54.

In this example, the determination of whether a given image found by mod 80 relates to subject matter defined by the subject-matter-description data input by the user is performed in the currently conventional way currently used by state of the art search engines. As those of skill in the art will appreciate, even current state of the art search engines cannot determine with perfect accuracy whether an image relates to subject matter of a searcher's request. For this reason, this document will use the phrase "apparently relate" to describe an image search result that is determined by the machine logic to relate to the subject matter of a search request, even though there is some possibility that a given image search result will have been incorrectly determined to relate to the desired subject matter.

In this example, the determination of whether a given image found by mod 80 falls between the first and second boundary conditions is determined by metadata respectively present in the image file of the found images. This metadata may include common image metadata fields, such as "date photograph taken" and/or "date modified." In this simple example, if the metadata dates indicate that the image falls between the first and second boundary conditions, then it is determined to fall between these boundaries. It is possible that mod 80 will not be able to determine with perfect accuracy whether an image really does fall between the boundary conditions (for example, inaccurate metadata could cause an incorrect determination). For this reason, this document will use the phrase "apparently fall" to describe an image search result that is determined by the machine logic to fall between the boundary conditions, even though there is some possibility that a given image search result will have been incorrectly determined to fall between the first and second boundary conditions.

In this example, the determination of whether an image falls between the boundary conditions is relatively simple, in part because the boundary conditions use the same calendaring and timekeeping conventions that is commonly used in image metadata. In other embodiments, the determination as to whether the image falls between the boundary conditions will rely on the substantive content and/or meaning of the image itself. An example discussed below relies on machine logic to determine whether images of rose plants occur between the "bud" stage of the rose plant and the "blossom" stage of the rose plant. This requires the machine logic to be structured and/or programmed with some way of determining what a rose plant would look like between its "bud" and "blossom" boundary conditions. Image analytics software can perform this function. Processing proceeds to step S58, where ordering mod 81 orders the found search results that have been found to meet the subject matter and boundary conditions discussed in connection with step S56. In this example, the boundary conditions are conditions of time so the ordering will be time ordering from 1 Jan. 2007 to 31 Dec. 2010, and this ordering, by mod 81, will be based on image metadata times and dates. Alternatively, when the boundary conditions are space conditions then the ordering will be based on an order in space. For example, if the space boundary conditions are "East Coast USA" and "West Coast USA," then: (i) images of Washington D.C. would precede images of Chicago, Ill.; and (ii) images of Chicago, Ill. would precede images of San Jose, Calif.

In other embodiments of the present invention, the ordering of the images, performed by machine logic such as software, may be more complex, and may involve analytics. As used herein, "analytics" means preprocessing and analysis. For example, if a person gives the boundary conditions as "infant" to "adult," it can show results of images of either a human or any animal or intermixed (as the terminology is used for humans as well as animals). But the result should preferably show the sequence of an infant to adult images of a single and same type of animal and not intermixed to make it more meaningful. Such queries are categorized as complex where the preprocessing and analysis of the images need to be done considering the semantic meaning associated with the image depiction and then sorting and short-listing the search result. Image depiction and identifying the semantics associated with it is known in the prior art and leveraged by such implementation.

Some embodiments of the present invention search for images exclusively in video frames in order to return search results. Once two images are given, then boundary condition is defined. Between the boundaries the intermediate images will be identified. These video-only embodiments are discussed in more detail, below, in the Further Comments And/Or Embodiment(s) sub-section of this Detailed Description section.

Processing proceeds to step S60, where assemble video mod 82 assembles a video out of the ordered images. In some cases, the vast majority of the images may be still images, so that the video will have the appearance of a film strip or slide show. In other cases, there may be a lot of video footage so that the video appears more like something people typically consider to be a movie. In some embodiments, features like zoom, pan, crop, color adjustment and the like may be applied when the images are assembled into the video. In these examples, the video is assembled into the form of an .mpg format video file with moderate video compression and no sound. Alternatively, the video may have sound. This sound may or may not come from the image files themselves (for example, sound based on still image metadata, and sound from video images that include an audio portion). As a further alternative, other video file formats (now known or to be developed in the future) may be used.

Processing proceeds to step S62 where user interface mod 77 returns the video to browser 13 of user sub-system 12 (see FIG. 1) as both a download video file and as streaming video to be played by the browser's video player 14. This video, as it appears on user's display device 15, is shown in FIGS. 4A, 4B, 4C, 4D, 4E, 4F. Because of the user's subject-matter description data and boundary condition data, FIGS. 4A to 4F show time ordered images taken in Alexandria, Va. between 1 Jan. 2007 and 31 Dec. 2010.

Because the scope of the subject matter (that is, the city of Alexandria) and the time scope defined by the boundary conditions (that is, several years) are both so large, there does not appear to be much thematic unity to the resulting video. Alternatively, steps may be taken to ensure a greater degree of thematic unity. For example, the user could identify documents and/or electronic communication that can be used by the search engine's machine logic to select a sub-set of images which will result in a video with greater thematic unity.

III. Further Comments and/or Embodiments

Some embodiments of the present invention may include one, or more, of the following features, characteristics and/or advantages: (i) a system wherein images returned by a computerized image search are automatically (and without human intervention) assembled into a video (the "search result video") which includes the images returned by the image search; (ii) in the search result video, the images are displayed in a sequential manner; (iii) the search terms used to generate and/or define the image search results are "boundary conditions;" (iv) the boundary conditions are words and/or images; (v) the user can select or upload one image for related image search (in this case, existing prior art searches related image based on single image input); and/or (vi) image search system including a mechanism to define a boundary condition of an image search by uploading two or more images to define, at least in part, a scope of the image search.

An example of a method according to the present invention will now be discussed. In this example, a user wants to find image search results on how red roses are blooming, in this case the blooming of the red roses is an event. Accordingly, the user uploads at least two (2) images, which respectively represent: (i) rose(s) that are just beginning to bloom; and (ii) rose(s) that are finished with the blooming process. Using these uploaded images as inputs, a software algorithm according to the present invention collects other images of rose(s) in the intermediate stages of the blooming process and assembles these into a time ordered "film strip" (that is, video file). This collection of intermediate images and assembly of collected images into the video of the video file is accomplished with little or no human intervention. Rather, the "intelligence" which drives the collection and assembly of the video comes, at least primarily from machine logic (in this example, software). It is further noted that the machine logic collection of images and the machine logic assembly of images may well take place as substantially concurrent steps, where the video under assembly helps define the manner in which further images are sought and chosen from available image sources.

In some embodiments of the present invention, a video assembly system receives, as user input, a search query. The search query includes first boundary condition data and a second boundary condition data. The first and second boundary condition data can be in the form of text or images. The boundary conditions may be boundary conditions of time or space. If the boundary conditions are time boundaries, then the video assembly system will collect and assemble images (see definition of "images," below, in the definitions subsection) in an order controlled by time (forward time or reverse time order). If the boundary conditions are space boundaries, then the video assembly system will collect and assemble images in an order controlled by space (for example, a journey along Fifth Avenue in New York City). Based on the boundary conditions, the video assembly system further can display the assembled video in human readable form and format (with or without sound).

Another example embodiment of the present invention involves scientific research. In this example, a user searches for an evolution of a particular cell from its "birth" to its "death." The birth and death are the boundary values supplied as images by the user as user input to the video assembly system. Software according to the present invention applies image processing and an image relational algorithm to help get the next sequenced images to formulate a continuous video. Once the software assembles the continuous video, the video is returned as responsive output to the search query.

Some embodiments of the present invention may additionally accept "intermediate boundary conditions," where the user supplies boundary condition data intermediate (in time or space) with respect to the beginning and ending boundary conditions. These intermediate boundary conditions can greatly assist the machine logic of the present invention in its image collection and assembly, such that the resulting video better depicts the time and/or space ordered sequence of images that is more pleasing and/or useful to the user.

As a further example of an embodiment of the present invention, a user wants a video of a red color rose blossoming, with the further stipulation that the rose should be from a place called ABC Gardens located in Holland. Accordingly, the user gives the following search grammar as a search query: (i) what to search for="rose;" (ii) start boundary="bud;" (iii) end boundary="blossom;" (iv) color="red;" (v) location="ABC Gardens, Holland;" and (vi) return format="film strip of sequenced images of a red rose tagged with ABC Gardens blossoming from a bud to a flower."

Some methods and/or systems according to the present invention may include one, or more, of the following steps, characteristics and/or features: (i) user uploads two, or more, images in image search portal to define boundary condition for event based image search (along with optional conditions); (ii) one uploaded image will be considered as the start of the event and another image will be considered as the end of the event; (iii) software will automatically search for intermediate images of the event; (iv) software will create a film out of those images; (v) user also uploads additional images to be considered as intermediate image input of the boundary condition; (vi) any time ordered subject matter, such as the opening of a flower, can be input as the search query; and/or (vii) search query subject matter could be a sequence of time ordered of a wide variety of different types of events, such as size change, a color change; a person and/or animal aging, food being prepared or spoiling, movement within an area, pictures of shapes with less to more sides, pictures of shapes with smaller to bigger lines used for the outline, etc.

Figure 5:
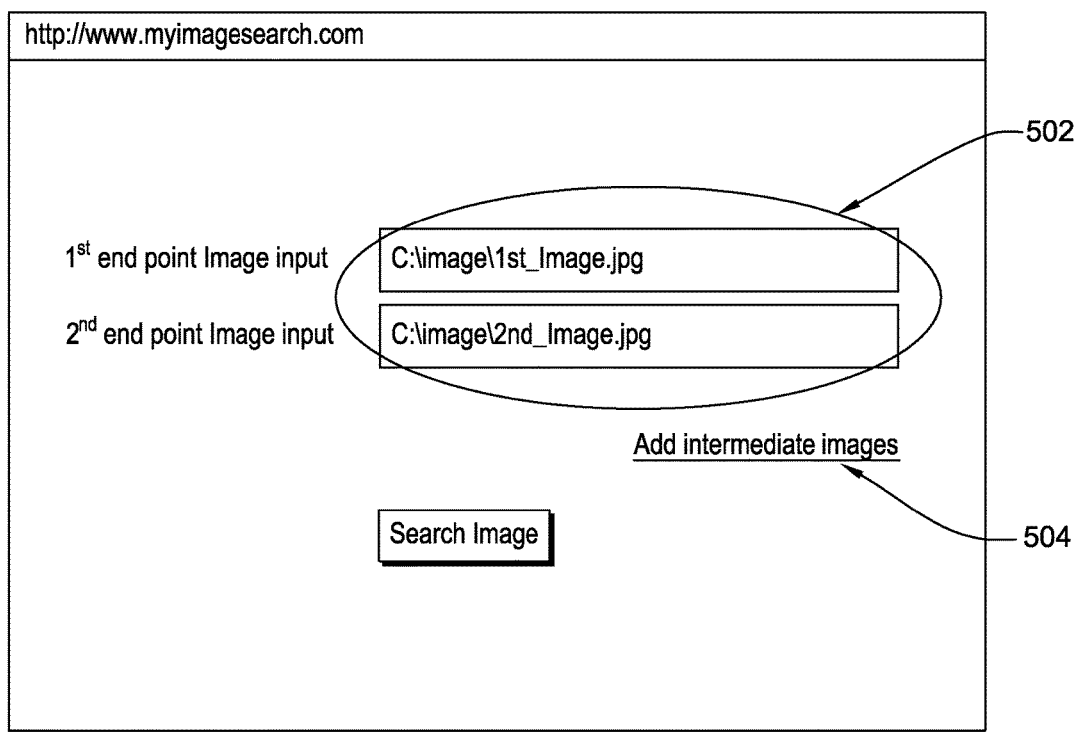
FIG. 5 is a screenshot generated by a second embodiment system according to the present invention and showing a user input screen.

FIG. 5 shows screenshot 500 including portion 502 and portion 504. At screenshot portion 502, it is shown that a user has provided two images as image search input. In this case the two images are two end points of the event. The search engine will search images between the two image inputs. The user can also provide one or more intermediate images, as shown at screenshot portion 504. Following are the implementation steps associated with the embodiment of screenshot 500: (i) user uploads or provides a link (for example, a URL (uniform resource locator) link) of two images (corresponding to the two temporal end points of an event) as image search input—the purpose of providing two images are to define time boundary conditions of the time ordered event; (ii) software will extract the features from the two input images and will perform semantic analysis; (iii) based on the two input images the software will attempt to fashion a meaningful definition of an "event" (for example, once two images define the boundary conditions in a video file, then contextual analysis of the video section can be done to know the event name); (iv) if the software is unable to determine an event definition at the previous step, then the user will provide one or more intermediate images or drawings to assist the software in defining the event; (v) once the event has been reasonable and correctly defined then the software will search for images (for example, still images, video images) of the event; (as mentioned earlier, by defining a boundary video section can be identified); (vi) the software ranks the images based on a time ordered sequence based on similarities and differences in relevant image features as between the collected images; (vii) Once the event is identified then invention will gather subsequent images from the identified video clip; (viii) in this example, images determined to represent points of time prior to the first boundary condition image, or subsequent in time to the second boundary condition image, will be discarded; (ix) the software concatenates, as a video file, the sequenced images that were determined to be representational of the event at points in time occurring between the boundary conditions defined by the user input.

Further with respect to item (ii) in the previous paragraph, semantic analysis of images is conventional, and some embodiments of the present invention leverage these known techniques of semantic analysis (like statistical generative model) over images to achieve the collection and/or ordering of search results by the search engine.

Note the image input of the search query can: (i) be replaced by text; and/or (ii) even have a condition associated with it.

In some embodiments of the present invention, the boundary conditions are defined by contents from one, or more, text based documents, and, based on these document-derived boundary conditions, image search results are displayed. As an example, of this kind of embodiment, there are different varieties of dinosaurs available (more than 100) at a given website. As per a syllabus of an educational course, there are only 15 dinosaur varieties relevant to the course. This means that a typical course student may not want to get all the details of all the dinosaur varieties which are shown at the website, but not relevant to her educational course. In other words, the student wants to find image search results of only those dinosaurs which are in the syllabus.

Software according to an embodiment of the present invention provides the following service: (i) while providing an image search query (in the example under discussion the user-provided "key phrase" of the query is "dinosaur varieties"), a user uploads one, or more, documents (for example, URL-addressable website document) which can be used to define a scope of the user's desired image search; (ii) the image search system will extract information from the specified document to identify how the information of the document can be used as a limitation on the specified image search topic; (iii) the scope of the image search requirement will be identified from the content of the specified document; (iv) based on the search limitations determined by software in the previous step, the software proceeds to identify search results that are both related to the key phrase and within the scope of the further limitations derived from the specified document; and (v) the software proceeds to display the search results determined at the previous step in a human readable form and format.

Software according to an embodiment of the present invention provides the following service: (i) a user has uploaded the link to a dinosaur-related website in order to help define and/or limit the scope of a search based on the key phrase "dinosaur;" (ii) the user-specified dinosaur-related web site includes five categories of dinosaur-related information (dinosaur species (10 species), types of eggs, foods, behavior, fossils); (iii) software according to the present invention displays the image search results for each of the five categories mentioned in the user-specified dinosaur website; and (iv) by effectively providing the categories for organizing the image search results, the user gets her desired information in a structured way (which can reduce or eliminate the need to review unrelated search results).

Software according to an embodiment of the present invention provides the following service: (i) a user has been studying the alphonso genre of mangoes and discussing the same with her research colleagues by computer network based communications (such as, email, social media websites, online chat and the like); (ii) the user decides to do a search for different types of mangoes; (iii) responsive to receiving the key phrase "mango" from the user, a search engine according to the present invention accesses the user' previous electronic communications to further limit and/or organize the results of the search; (iv) in this example, the search engine software determines that the user is likely interested in the alphonso genre of mangoes and will give the user the options of limiting the search to alphonso mangos, making alphonso mangoes as a separate category in the search results or take no special actions based on whether the search results relate to alphonso mangoes; and (v) in this example, responsive to the user's choice of limiting the search to the alphonso genre of mangoes, the only search results returned to the user are alphonso mango related search results.

A method according to an embodiment of the present invention includes the following steps: (i) a user uploads at least a first and second image in an image search portal to define boundary conditions for an "event based image search" (the first image represents the start of the event and the second uploaded image represents the end of the event; (ii) machine logic according to the present invention searches for intermediate images of the event (the "returned images"; and (iii) machine logic according to the present invention creates a video that includes the returned images. As an optional, additional step for the above method, the user can also upload more intermediate image(s) that represent the event at intermediate point(s) in time between its beginning and its end.

Some additional remarks will be made regarding the way in which some embodiments find images which occur between boundary conditions. Once two, or more images are provided as search criteria, the software will consider each image input as boundary condition. Accordingly the search will be performed in different video files or video clips (that is, some embodiments may be limited to searching video clips, and/or search still images). In these embodiments, the input images will perform search in video files. Assume that a user has provided two input images. This means that a search will be performed in videos available in the public domain. Accordingly, the system will find a match/close match where the first image is available in any of the video frames. Once the first frame is found, the search engine will search for the second input image in the video frames. If the user's first and second input images are found, by the search engine, in a single video file, then the video frames in-between the first and second video frames will be returned as responsive search results. In this case, the search engine would likely not need to re-order the video frame images because they would likely be in the correct order as they are extracted from the video file in which the video frames reside.

In most cases, a video file is basically playing 24+ subsequent images per second, so the search engine of this type of embodiment will select some frames from the defined boundary, and, accordingly, will compare against the adjacent image. If the search engine finds the rate of change between two adjacent images are huge then the system will reject the selection. The selection of video frames within the boundary can be a random sampling, or based on equidistance image frames. Note: Image comparison to detect similarity of the image content (given any two images) is conventional such that persons ordinarily skilled in the art of image analysis will be able to implement these embodiments.

IV. Definitions

Present invention: should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein that are believed as maybe being new, this understanding, as indicated by use of the term "present invention," is tentative and provisional and subject to change over the course of patent prosecution as relevant information is developed and as the claims are potentially amended.

Embodiment: see definition of "present invention" above—similar cautions apply to the term "embodiment."

and/or: inclusive or; for example, A, B "and/or" C means that at least one of A or B or C is true and applicable.

User/subscriber: includes, but is not necessarily limited to, the following: (i) a single individual human; (ii) an artificial intelligence entity with sufficient intelligence to act as a user or subscriber; and/or (iii) a group of related users or subscribers.

Module/Sub-Module: any set of hardware, firmware and/or software that operatively works to do some kind of function, without regard to whether the module is: (i) in a single local proximity; (ii) distributed over a wide area; (iii) in a single proximity within a larger piece of software code; (iv) located within a single piece of software code; (v) located in a single storage device, memory or medium; (vi) mechanically connected; (vii) electrically connected; and/or (viii) connected in data communication.

Computer: any device with significant data processing and/or machine readable instruction reading capabilities including, but not limited to: desktop computers, mainframe computers, laptop computers, field-programmable gate array (fpga) based devices, smart phones, personal digital assistants (PDAs), body-mounted or inserted computers, embedded device style computers, application-specific integrated circuit (ASIC) based devices.

Images: still images and/or video (with or without sound); as used herein, "images may refer, depending on context, to the human readable display of the image, or to the machine readable data set that can be used to generate a human readable image.

What is claimed is:

1. A method comprising:
    receiving, by an image search engine, a document-identifying data set that identifies a document;
    determining, by the image search engine, a search result rule based on content of the document;
    receiving, the image search engine, a search query including a subject-matter-describing data set, a first boundary-condition-describing data set and a second boundary-condition-describing data set, wherein the first-boundary-condition-describing data set and the second boundary-condition-describing data set define, in part, a pathway of physical progression that links a first boundary condition to a second boundary condition, wherein the pathway of physical progression defines a physical transformation of a physical object from a first form into a second form, and wherein the image search engine includes an image analytics software;
    determining, by the image search engine, the first boundary condition based on the first boundary-condition-describing data set;
    determining, by the image search engine, the second boundary condition based on the second boundary-condition-describing data set;
    finding, by the image search engine, a set of search results that meet the following criteria: (i) apparently relate to a subject matter of the subject-matter-describing data set, and (ii) are apparently included in the pathway of physical progression, wherein (a) each search result in the set of search results is an image, and (b) a first search result in the set of search results apparently falls between the first boundary condition and the second boundary condition based, at least in part, on a content of the first search result and a physical characteristic of the first search result;
    determining, by the image search engine, a context for the first search result based on the physical characteristic of the first search result in relation to the pathway of physical progression;
    generating, by the image search engine, an ordered set of images that includes the first search result, wherein a location of the first image in the set of ordered images is based on the context of the first search result and the pathway of physical progression; and
    returning, by the image search engine, the set of search results in human readable form based, at least in part, on the search result rule, wherein the search result rule relates to at least one of the following: (i) a manner in which the set of search results are organized, or (ii) the scope of the set of search results returned.

2. The method of claim 1 further comprising:
    returning, by the image search engine to the computing device of the user, the set of search results in human readable form, wherein the set of search results are organized in an order based, at least in part, according to their relative intermediate locations along the pathway of physical progression, wherein the pathway of physical progression further describes at least one of (i) a physical progression along a pathway between two or more physical locations, and (ii) a pathway of physical change between a first physical form of the subject and a second physical form of the subject.

3. The method of claim 2 wherein the returning includes the following sub-steps:
    assembling, by the image search engine, a video that includes the set of search results in order according to their relative intermediate locations in physical space between the first boundary condition and the second boundary condition; and
    sending the video to the computing device of the user.

4. The method of claim 1 wherein the document identifying set includes one of the following: (i) a network address that can be used to retrieve the document over a communication network, or (ii) a document file that includes the document itself.

5. The method of claim 1, wherein determining the first boundary condition based on the first boundary-condition-describing data set further comprises:
    extracting a first set of features from the first boundary-condition-describing data set; performing a semantic analysis on the first set of features; and
    determining the second boundary condition based on the second boundary-condition-describing data set, in part, by:
    extracting a second set of features from the second boundary-condition-describing data set, and
    performing a semantic analysis on the second set of features.

6. The method of claim 1, further comprising: determining, by the image search engine, that a subset of the set of search results include a characteristic that excludes the subset of the search results from inclusion in the pathway of physical progression; and
    discarding, by the image search engine, the subset of the set of search results.

7. A computer program product comprising a non-transitory computer-readable storage medium program instructions having stored thereon:
- program instructions to receive, by an image search engine, a document-identifying data set that identifies a document;
- program instructions to determine, by the image search engine, a search result rule based on content of the document;
- program instructions to receive, by the image search engine, a search query including a subject-matter-describing data set, a first boundary-condition-describing data set and a second boundary-condition-describing data set, wherein the first-boundary-condition-describing data set and the second boundary-condition-describing data set define, in part, a pathway of physical progression that links a first boundary condition to a second boundary condition, wherein the pathway of physical progression defines a physical transformation of a physical object from a first form into a second form, and wherein the image search engine includes an image analytics software;
- program instructions to determine, by the image search engine, the first boundary condition based on the first boundary-condition-describing data set;
- program instructions to determine, by the image search engine, the second boundary condition based on the second boundary-condition-describing data set;
- program instructions to find, by the image search engine, a set of search results that meet the following criteria: (i) apparently relate to a subject matter of the subject-matter-describing data set, and (ii) are apparently included in the pathway of physical progression, wherein (a) each search result in the set of search results is an image, and (b) a first search result in the set of search results apparently falls between the first boundary condition and the second boundary condition based, at least in part, on a content of the first search result and a physical characteristic of the first search result;
- program instructions to determine, by the image search engine, a context for the first search result based on the physical characteristic of the first search result in relation to the pathway of physical progression;
- program instructions to generate, by the image search engine, an ordered set of images that includes the first search result, wherein a location of the first image in the set of ordered images is based on the context of the first search result and the pathway of physical progression; and
- program instructions to return, by the image search engine to a computing device of a user, the set of search results in a manner based, at least in part, on the search result rule, wherein the search result rule relates to at least one of the following: (i) a manner in which the set of search results are organized, or (ii) the scope of the set of search results returned.

8. The product of claim 7 wherein the medium further has stored thereon:
- program instructions to return, by the image search engine to the computing device of the user, the set of search results, wherein the set of search results are organized in an order based, at least in part, according to their relative intermediate locations along the pathway of physical progression, wherein the pathway of physical progression further describes at least one of (i) a physical progression along pathway between two or more physical locations, and (ii) a pathway of physical change between a first physical form of the subject and a second physical form of the subject.

9. The product of claim 8, wherein the program instructions further to include:
- program instructions to assemble, by the image search engine, a video that includes the set of search results in order according to their relative intermediate locations in physical space between the first boundary condition and the second boundary condition; and
- program instructions to send the video to the computing device of the user.

10. The product of claim 7 wherein the document identifying set includes one of the following: (i) a network address that can be used to retrieve the document over a communication network, or (ii) a document file that includes the document itself.

11. The computer program product of claim 7, wherein the program instructions to determine the first boundary condition based on the first boundary-condition-describing data set further comprise:
- program instructions to extract a first set of features from the first boundary-condition-describing data set, and
- program instructions to perform a semantic analysis on the first set of features,
- wherein the program instructions to determine the second boundary condition based on the second boundary-condition-describing data set further comprise:
- program instructions to extract a second set of features from the second boundary-condition-describing data set, and
- program instructions to perform a semantic analysis on the second set of features.

12. The computer program product of claim 7, further comprising: program instructions to determine, by the image search engine, that a subset of the set of search results include a characteristic that excludes the subset of the search results from inclusion in the pathway of physical progression; and
- program instructions to discard, by the image search engine, the subset of the set of search results.

13. A computer system comprising: a processor(s) set; and a non-transitory computer readable storage medium; wherein:
- the processor set is structured, located, connected and/or programmed to run program instructions stored on the non-transitory computer readable storage medium; and the program instructions include:
  - program instructions to receive, from an image search engine, a document-identifying data set that identifies a document;
  - program instructions to determine, by the image search engine, a search result rule based on content of the document;
  - program instructions to receive, by a machine logic based image search engine, a search query including a subject-matter-describing data set, a first boundary-condition-describing data set and a second boundary-condition-describing data set, wherein the first-boundary-condition-describing data set and the second boundary-condition-describing data set define, in part, a pathway of physical progression that links a first boundary condition to a second boundary condition, wherein the pathway of physical progression defines a physical transformation of a physical object from a first form into a second form, and wherein the image search engine includes an image analytics software;

program instructions to determine, by the image search engine, the first boundary condition based on the first boundary-condition-describing data set;

program instructions to determine, by the image search engine, the second boundary condition based on the second boundary-condition-describing data set;

program instructions to find, by the image search engine, a set of search results that meet the following criteria: (i) apparently relate to a subject matter of the subject-matter-describing data set, and (ii) are apparently included in the pathway of physical progression, wherein (a) each search result in the set of search results is an image, and (b) a first search result in the set of search results apparently falls between the first boundary condition and the second boundary condition based, at least in part, on a content of the first search result and a physical characteristic of the first search result;

program instructions to determine, by the image search engine, a context for the first search result based on the physical characteristic of the first search result in relation to the pathway of physical progression;

program instructions to generate, by the image search engine, an ordered set of images that includes the first search result, wherein a location of the first image in the set of ordered images is based on the context of the first search result and the pathway of physical progression; and program instructions to return, by the image search engine to a computing device of a user, the set of search results in a manner based, at least in part, on the search result rule, wherein the search result rule relates to at least one of the following: (i) a manner in which the set of search results are organized, or (ii) the scope of the set of search results returned.

14. The system of claim 13 wherein the program instructions further include:
program instructions to return, by the image search engine to the computing device of the user, the set of search results, wherein the set of search results are organized in an order based, at least in part, according to their relative intermediate locations along the pathway of physical progression, wherein the pathway of physical progression further describes at least one of (i) a physical progression along pathway between two or more physical locations, and (ii) a pathway of physical change between a first physical form of the subject and a second physical form of the subject.

15. The system of claim 14, wherein the program instructions further include:
program instructions to assemble, by the image search engine, a video that includes the set of search results in order according to their relative intermediate locations in physical space between the first boundary condition and the second boundary condition; and
program instructions to send the video to the computing device of the user.

16. The system of claim 13 wherein the document identifying set includes one of the following: (i) a network address that can be used to retrieve the document over a communication network, or (ii) a document file that includes the document itself.

17. The computer system of claim 13, wherein:
program instructions to determine the first boundary condition based on the first boundary-condition-describing data set further comprise:
program instructions to extract a first set of features from the first boundary-condition-describing data set, and
program instructions to perform a semantic analysis on the first set of features,
wherein the program instructions to determine the second boundary condition based on the second boundary-condition-describing data set further comprise:
program instructions to extract a second set of features from the second boundary-condition-describing data set, and
program instructions to perform a semantic analysis on the second set of features.

* * * * *